United States Patent
Fischer et al.

(10) Patent No.: US 7,294,913 B2
(45) Date of Patent: Nov. 13, 2007

(54) CATHODIC LEAD INSULATOR

(75) Inventors: Fred Fischer, Glenshaw, PA (US); Gregg Pelagio, New Kensington, PA (US); Dave Stephens, Pittsburgh, PA (US); Donald H. Kathrein, Northbrook, IL (US); C. Richard Reeves, Antioch, IL (US)

(73) Assignee: Chase Corporation, Pittsburgh, PA (US)

( * ) Notice: Subject to any disclaimer, the term of this patent is extended or adjusted under 35 U.S.C. 154(b) by 106 days.

(21) Appl. No.: 10/804,316

(22) Filed: Mar. 18, 2004

(65) Prior Publication Data
US 2005/0224247 A1    Oct. 13, 2005

(51) Int. Cl.
*H01L 23/02* (2006.01)
(52) U.S. Cl. .................................... 257/678
(58) Field of Classification Search ................ 257/678, 257/700
See application file for complete search history.

(56) References Cited

U.S. PATENT DOCUMENTS

| | | | |
|---|---|---|---|
| 3,214,509 A | 10/1965 | Hugo | 174/84 |
| 3,833,755 A * | 9/1974 | Soelberg | 174/117 F |
| 4,176,245 A | 11/1979 | Merlack et al. | 174/92 |
| 4,382,049 A | 5/1983 | Hofmeister et al. | 264/40.1 |
| 4,451,696 A | 5/1984 | Beinhaur | 174/92 |
| 4,862,893 A * | 9/1989 | Martinelli | 600/459 |
| 5,473,118 A * | 12/1995 | Fukutake et al. | 174/258 |

* cited by examiner

*Primary Examiner*—Roy Karl Potter
(74) *Attorney, Agent, or Firm*—Fish & Richardson P.C.

(57) ABSTRACT

A protective cap for adhesion to a substrate including a substantially flat base sheet, a dome extending outwardly from an obverse side of the base sheet and forming a cavity in the opposite side of the base sheet with the cavity sized for substantially encapsulating a connector. The cap also includes a semi-tubular shield extending outwardly from one side of the base sheet that defines a channel in the opposite side of the base sheet extending from the cavity toward the periphery of the base sheet, and an integrated primer layer comprising a pressure-sensitive adhesive and attached to the reverse side of the base sheet for application to the substrate.

15 Claims, 3 Drawing Sheets

CATHODIC LEAD INSULATOR

BACKGROUND

This invention relates to insulator caps for protecting wire leads in corrosive environments.

Various systems and methods are known for protecting metal structures, such as buried pipelines, from corrosion. One such system, identified broadly as cathodic protection, mitigates electrolysis and galvanic corrosion of the pipeline by making the pipeline cathodic (negative) to the earth in which it is buried. In one system of cathodic protection, known as cathodic protection, the negative polarity on the pipeline is made possible by direct current from a rectifier which generally is energized from a commercially available 60-cycle alternating current source. The negative terminal of the rectifier is connected to the pipeline, and the positive terminal of the rectifier is connected to a ground bed reference electrode system located a substantial distance from the pipeline.

In another system of cathodic protection, a protective metal of higher potential than the structure to be protected is, in effect, utilized as the source of current. When two such dissimilar metals are placed in an electrolyte (such as soil) and connected by means of an electrical conductor, a galvanic cell is created and current flows from the metal of higher potential to the metal of lower potential. In such a system, the protective metal of higher potential becomes the anode and the protective metal of lower potential becomes the cathode. In the cathodic protection of iron and steel, magnesium is commonly used as the anode metal. In such systems the anodes are placed around or along the structure to be protected in sufficient quantity and in strategic locations to protect all parts of the structure equally.

Protective coverings and/or wrappers comprising suitable insulating and water-proofing materials, such as the various bituminous protective covering materials, are more widely used than cathodic protection systems, primarily because they are usually less expensive and more readily installed. However, for maximum protection, particularly for relatively inaccessible structures such as buried pipelines, it is quite common to employ a combination of both a protective covering system and a cathodic protection system. Employing cathodic protection in combination with protective coverings has the advantage of ensuring against imperfections or failures in the protective covering. In all types of cathodic protection, it is necessary to install various metal to metal connections between electrical conductors and the metal structure to be protected. With some metal structures, such as the pipe in buried pipelines, the protective covering material is usually placed on the pipe before and/or as it is being installed in the earth. The necessary metal to metal connections for cathodic protection are usually installed after the pipeline is in place because it is more convenient to do so. In the repair and maintenance of pipelines, such connections are always installed after the pipeline with its protective covering thereon is in place.

Installing protective and insulating covers on a substrate such as a pipeline or storage tank requires particular steps for preparing the surface. For example, the surface of a pipeline can require abrasion, cleaning and drying to improve adhesion. Further, a separate primer is generally applied to the cover and/or the pipeline which must be allowed sufficient time to dry. Such steps are often subject to minimum ambient application temperatures, which can necessitate the availability of portable heat sources. Such methods are expensive, time consuming and can lead to inconsistency of application. In pipeline applications, trench back-fill or soil movement can cause the failure of improperly established seals.

SUMMARY

In general, in one aspect, the invention features a protective cap for adhesion to a substrate and includes a substantially flat base sheet, a dome extending outwardly from an obverse side of the base sheet and forming a cavity in the opposite side of the base sheet, the cavity sized for substantially encapsulating a connector, a semi-tubular shield extending outwardly from one side of the base sheet and defining a channel in the opposite side of the base sheet extending from the cavity toward the periphery of the base sheet, and an integrated primer layer comprising a pressure-sensitive adhesive and attached to the reverse side of the base sheet for application to the substrate.

Implementations of the invention may include one or more of the following features. The primer layer can be made from a polyolefin material, synthetic or thermoplastic elastomers, synthetic resins, or any combination of the foregoing. The primer layer can have a service temperature between about −30 and 150 degrees F (−35 to 66 degrees C) and an application temperature of at least about −10 degrees F (−23 degrees C). In one example, the primer layer has a total thickness from between about 40 and 60 mils (1 and 1.52 mm). The primer layer can be elastically deformable to about a 0.5 inch radius at about −40 F (15.7 radius at −28.9 C). The primer layer can exhibit a dielectric strength of at least about 15 kV and a resistivity of at least about 108 megohms. The primer layer materials can also be formed to absorb less than about 0.05 percent water, by weight, of the primer layer.

The base sheet of the protective cap can include substantially linear perforations for improved flexibility. The cavity can contain a yieldable insulating liquid compound for conforming around the connector. The cap can also include at least one release liner attached thereto, extending along the obverse side of the base.

In general, in another aspect, the invention features a protective cap for a connector adapted for adhesion to a substrate. The protective cap includes a planar base sheet, an igloo-shaped dome extending outwardly from an obverse side of the base sheet and forming a cavity in the opposite side of the base sheet that is sized for encapsulating the metal connector. A semi-tubular shield extends outwardly from one side of the base sheet and defines a channel in the opposite side of the base sheet extending from the cavity toward the periphery of the base sheet. The shield is sized for substantially encapsulating a lead extending from the connector. An integrated primer layer including a pressure-sensitive adhesive is attached to the reverse side of the base sheet for application to the substrate, and an adhesive layer having at least one release liner attached thereto, extends along the obverse side of the base.

In general, in another aspect, the invention features a method for protecting a wire lead extending from a substrate including providing a protective cap including a substantially flat base sheet and an integrated primer layer along a lower surface of the sheet, the primer layer having a pressure-sensitive adhesive protected by a release liner; positioning the protective cap proximate the wire lead; removing the release liner to expose the pressure-sensitive adhesive; and applying the protective cap to the wire lead such that at least part of the lead penetrates the integrated primer layer.

The base sheet can include substantially linear perforations for applying the protective cap about substrates having substantially small diameters.

Other advantages and features will become apparent from the description and from the claims.

DESCRIPTION

Figure 1:
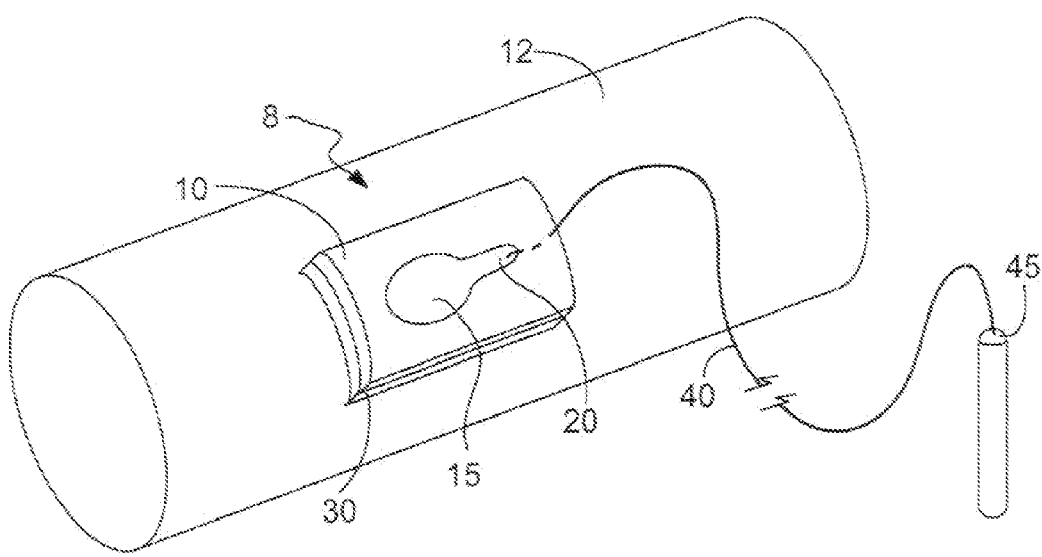
FIG. 1 is a perspective view of an insulator cap applied to a cathodically protected pipe.
Figure 2:
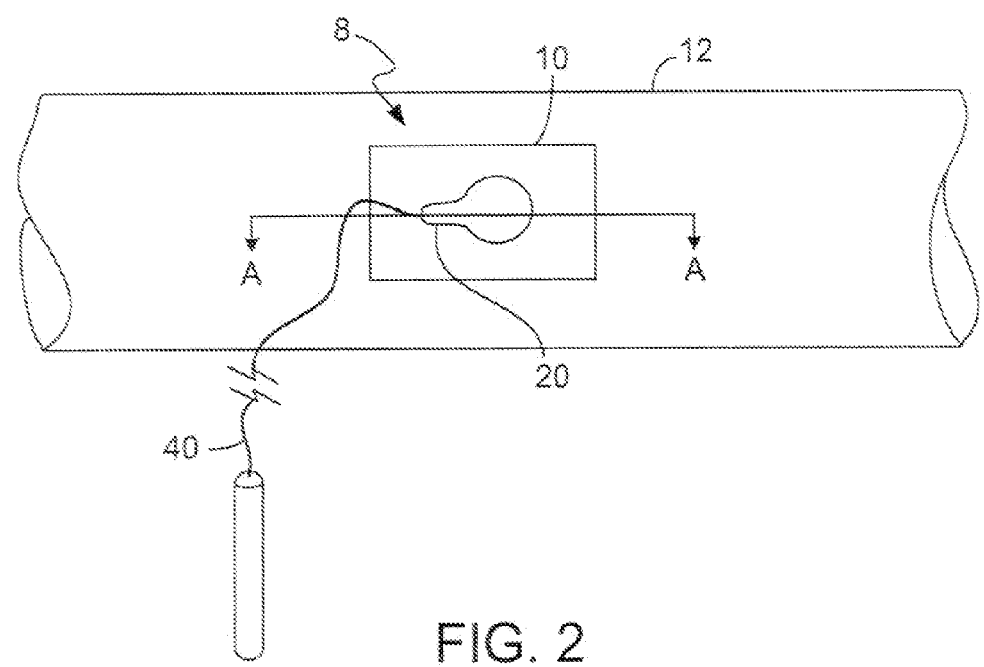
FIG. 2 is a top view of an insulator cap applied to a cathodically protected pipe.

As seen in FIGS. 1 and 2, an insulator cap 8 includes a base 10 having a generally rectangular periphery of a size and shape to surround an opening in a protective covering 12 on the metal structure to which the cap is applied. A hemispherical dome 15 extends outwardly from substantially the center of the base and forms a cavity in the opposite side of the base. In one example, the cap is vacuum-formed from thermoplastic insulating material and has dimensions of about 4-inches square. While the base 10 is shown as generally rectangular, it can be any suitable size and shape, such as oval, square, or circular. A semi-tubular shield 20 extends outwardly from the dome and provides a channel in the base which extends from the dome toward the periphery of the base. The semi-tubular shield can be of other suitable shapes, such as square or triangular, instead of semi-circular as shown. A number of tubular shields may also extend from the base (not shown). Dome 15 can have any other suitable shape, such as semi-oval or semi-elliptical, instead of hemispherical.

An adhesive layer 30 extends along the bottom surface of the base. The layer requires no separate primer for adhesion and can be made from a polyolefin material, synthetic or thermoplastic elastomers, synthetic resins, or any combination of the foregoing. The primer layer can have a service temperature between about −30 and 150 degrees F (−35 to 66 degrees C) and an application temperature of at least about −10 degrees F (−23 degrees C). In one example, the primer layer has a total thickness from between about 20 and 60 mils (1 and 1.52 mm). The primer layer can be elastically deformable to about a 0.5 inch radius at about −40 F (15.7 radius at −28.9 C). The primer layer can exhibit a dielectric strength of at least about 15 kV and a resistivity of at least about 108 megohms. The primer layer materials can also be formed to absorb less than about 0.05 percent water, by weight of the primer layer. One presently preferred material is the Moldable Sealant product, available from the Tapecoat Company, Evanston, Ill.

Figure 3:
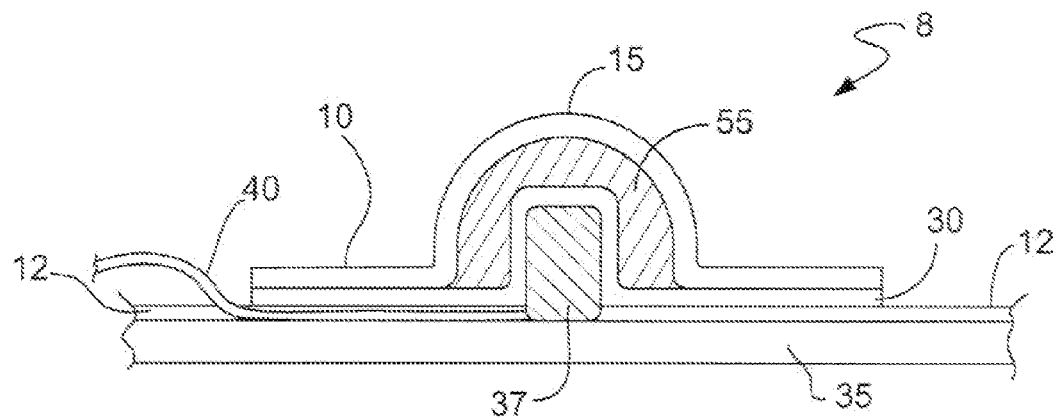
FIG. 3 is a cross-sectional view taken along line A-A of FIG. 2.

Referring to FIG. 3, a protective cap is affixed over an opening in the protective covering 12 along a section of pipeline 35. The dome is positioned over a metal to metal connection 37, between an insulated lead wire or electrical conductor 40 and the pipeline. The electrical conductor 40 extends from the connection through the channel provided by the tubular shield and to an anode 45 (FIG. 1) made of a suitable metal, such as magnesium.

The metal to metal connection can be any suitable type of weld such as that formed by thermite welding using a suitable portable mold and apparatus. It will be understood it is within the scope of the invention to employ other means of making the metal to metal connection such as electrical welding, acetylene welding, brazing, soldering or, for that matter, screw connections between a lug formed on the metal structure and the electrical conductor.

In completing the installation shown in FIG. 3, a release liner 50 (FIGS. 5A and 5B) is first peeled back from the adhesive layer 30. In one example, the connector 37, the opening in protective covering 12, and the portion of the protective covering adjacent the opening are all substantially covered by the adhesive layer 30. The protective cap is then placed in position with the dome over the connection and the base over the portions adjacent the conductor, and the cap is then pressed firmly into position so as to force a portion of the adhesive layer beyond the periphery of the cap and thus ensure contact with the protective covering material and the formation of a sealing bond between the cap and the protective covering material.

Figure 5A:
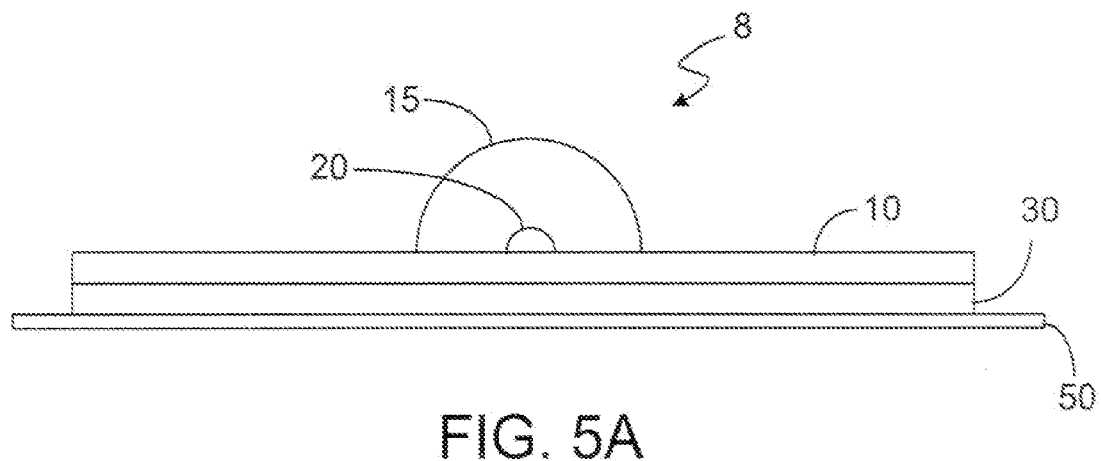
FIG. 5A is a side view of the insulator cap of FIG. 4.
Figure 5B:
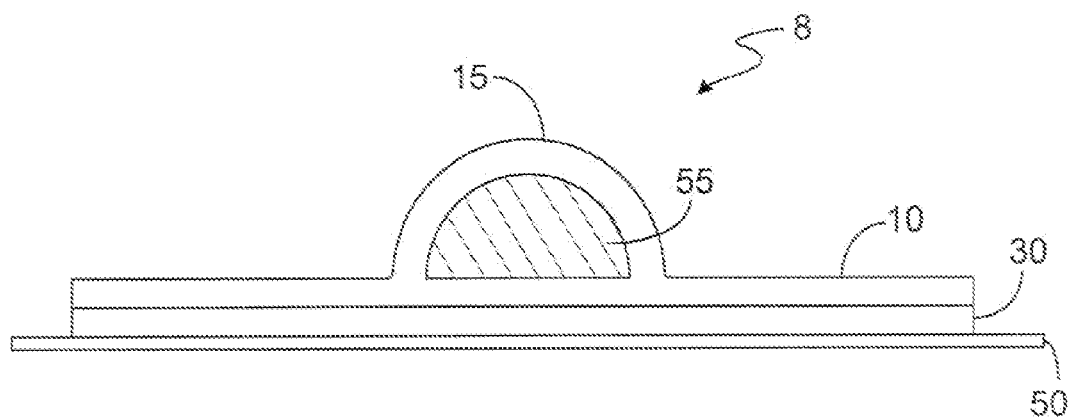
FIG. 5B is a cross-sectional view taken along line B-B of FIG. 4.

In one example, referring to FIGS. 5A, 5B, the protective cap will be relatively thin and the connection will extend above the protective covering. In this application, it is useful to fill the cavity formed by the dome and the channel formed by semi-tubular shield in the protective cap with a yieldable compound 55, such as a butyl rubber adhesive. The compound is retained within the covering by the adhesive layer until the covering is applied to the connection, such that the connection penetrates the adhesive layer and forces a portion of the compound to conform around the connector and the lead to form a sealing bond therewith. In so doing, the yieldable compound encapsulates the connection and the portion of the conductor proximate thereto.

Figure 4:
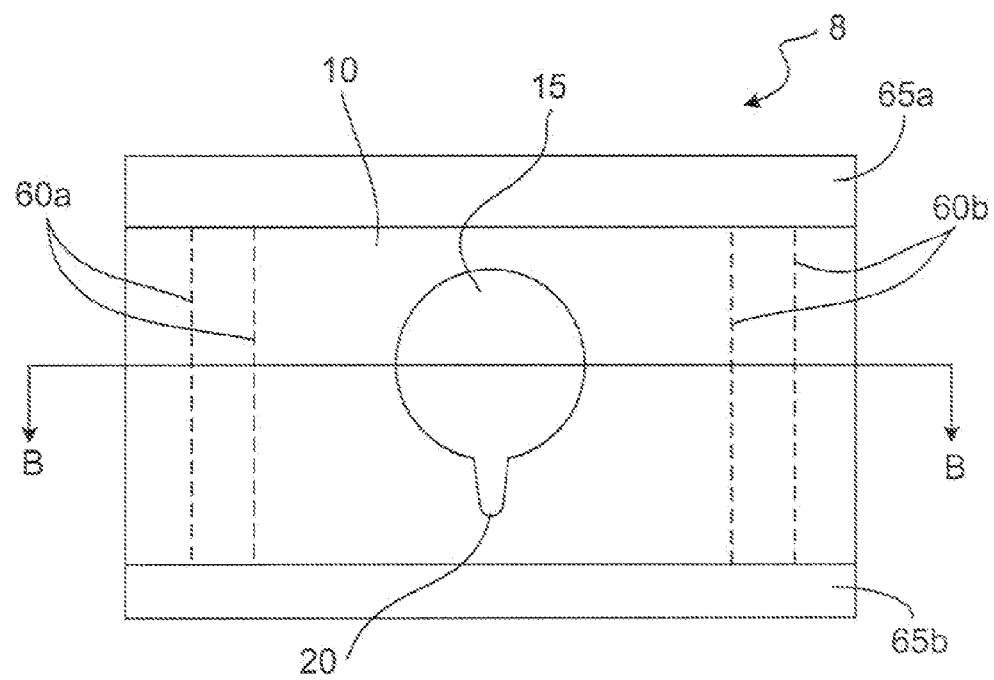
FIG. 4 is a top view of an insulator cap.

Referring to FIG. 4, the base of the insulator cap can also include elongated indentations or perforations 60a, 60b to increase the conformability of the cap for application around smaller diameter pipes. The cap can also include adhesive layers 65a, 65b along the top surface of the base which are covered by release liners until removed for application. The layers provide temporary adhesion of the top portion of the protective cap to a first pronged-end of a key hole installation tool (not shown) used for applying the protective cap to surfaces located within deep excavations. The two strips are removed and with the dome side up the adhesive layer is positioned against the prongs of the tool. The release backing is then removed, the tool is lowered into the excavation, and the protective cap is positioned and applied over the metal to metal connection, such as an exothermic weld, for example. The installation tool is then removed from the excavation and a second end of the installation tool which includes a custom designed pressure plate is lowered into the excavation to engage the protective cap with a downward pressure, adhering it to the surface to be protected. The installation is completed with a gentle rocking of the tool to release it from the protective cap now installed on the surface.

The protective cap can be fabricated from any suitable material such as plastic materials having insulating properties. Exemplary materials include thermoplastics such as polyethylene, polypropylene, copolymers of ethylene and propylene, polystyrene, polyvinylchloride, mixtures of polyethylene and polyisobutylene, mixtures of copolymers of ethylene and propylene with polyisobutylene, and the like. A particularly well-suited material is black or white polyethylene, i.e., polyethylene containing carbon black or titanium dioxide added thereto as a pigment.

The protective cap of the invention can be formed or fabricated in any known suitable manner. When using thermoplastic materials, such methods as thermoforming (by either vacuum or pressure), blow molding, and injection molding can be utilized. It is preferred that the base, dome and semi-tubular shield be formed as an integral unit. However, it will be understood that the base, the dome, and the semi-tubular be formed separately with the cap then assembled by cementing the dome and tubular shield to the base employing any suitable cement or adhesive.

Reference has been made herein to protective covering materials. The term "protective covering" is employed generically herein and in the claims to include materials which are applied as a coat or layer on the surface of the structure to be protected, such as a coal tar pitch, a petroleum asphalt, pressure-sensitive tapes, and extruded plastic coatings, and also materials which are commercially referred to as wrapping materials and which are applied on the outside of a layer of coal tar pitch or petroleum asphalt. The term "bituminous" is employed generically to include both coal tar pitches and petroleum asphalts and also the various mastic coating materials. Thus, the combined terms "bituminous protective coating" and "bituminous protective covering" are used generically to include a protective coating or protective covering which comprises a layer of bituminous material on the pipe or other structure to be protected, or which comprises a layer of bituminous material and a layer of wrapping material such as asphalt-saturated rag, asphalt-saturated asbestos felt, or glass fiber mats, applied outside the bituminous layer.

If desired, another layer of the bituminous material can then be added to the outside of the wrapping material and still another layer of wrapping material outside the another layer of bituminous material. Such protective coverings are well-known to those skilled in the art and are widely used in the protection of pipelines, tanks, etc. Detailed specifications of materials and methods of applying same can be found in the booklet "Asphalt Protective Coating for Pipelines" Construction Series, No. 96, published by the Asphalt Institute, 801 Second Avenue, New York, N.Y. The booklet also gives specifications for petroleum asphalts suitable for use as protective coatings for pipelines or other buried objects. Specifications for suitable coal tar pitches can be found in the Booklet AWWA C403-51 published by the American Water Works Association, New York, N.Y.

Exemplary dimensions of the insulator cap are as follows. The base has a length of 3½ inches (8.9 cm) and a width of 3 inches (7.6 cm). The dome has a diameter of 1½ (3.8 cm) inches and a radius of curvature of ¾ inch (1.9 cm). The radius of curvature of tubular shield 15 is 3/16 inch (4.7 mm). The radius of curvature of the concave surface of base is 3 inches (7.6 cm). The cap is fabricated as an integral unit from sheet polyethylene having a thickness of 20-40 mils (0.5-1.0 mm). It is within the scope of the invention to fabricate the protective cap of any dimensions suitable for the particular use or installation intended.

Other implementations are within the scope of the following claims.

What is claimed is:

1. A protective cap for adhesion to a substrate, the cap comprising:
    a substantially flat base sheet;
    a dome extending outwardly from an obverse side of the base sheet and forming a cavity in the opposite side of the base sheet, the cavity sized for substantially encapsulating a connector;
    a semi-tubular shield extending outwardly from one side of the base sheet and defining a channel in the opposite side of the base sheet extending from the cavity toward the periphery of the base sheet; and
    an integrated primer layer comprising a pressure-sensitive adhesive and attached to the reverse side of the base sheet for application to the substrate, in which the primer layer comprises a polyolefin material and synthetic elastomers.

2. The cap of claim 1 in which the primer layer comprises thermoplastic elastomers and synthetic resins.

3. The cap of claim 1 in which the primer layer is a material selected from the group containing polyolefin and synthetic elastomers.

4. The cap of claim 1 in which the primer layer has a service temperature of between about −30 and 150 degrees F (−35 to 66 degrees C).

5. The cap of claim 1 in which the primer layer has an application temperature of at least about −10 degrees F (−23 degrees C).

6. The cap of claim 1 in which the primer layer has a total thickness from between about 20 and 60 mils (1 and 1.52 mm).

7. The cap of claim 1 in which the primer layer is elastically deformable to about a 0.5 in radius at about −40 F (15.7 radius at −28.9 C).

8. The can of claim 1 in which the primer layer exhibits a dielectric strength of at least about 15 kV.

9. The cap of claim 1 in which the primer layer exhibits a resistivity of at least about $10^8$ megohms.

10. The cap of claim 1 wherein the primer layer absorbs less than about 0.05 percent water, by weight of the primer layer.

11. The cap of claim 1 in which the base sheet comprises substantially linear perforations for improved flexibility.

12. The cap of claim 1 wherein the cavity contains a yieldable insulating liquid compound conforming around the connector.

13. The cap of claim 1 further comprising at least one release liner attached thereto, extending along the obverse side of the base.

14. A protective cap tot a connector adapted for adhesion to a substrate, the cap comprising:
    a planar base sheet;
    an igloo-shaper dome extending outwardly from an obverse side of the base sheet and forming a cavity in the opposite side of the base sheet, the cavity sized fro encapsulating the metal connector;
    a semi-tubular shield extending outwardly from one side of the base sheet and defining a channel in the opposite side of the base sheet extending from the cavity toward the periphery of the base sheet, the shield sized for substantially encapsulating a lead extending from the connector;
    an integrated primer layer comprising a pressure-sensitive adhesive and attached to the reverse side of the base sheet for application to the substrate; and
    an adhesive layer having at least one release line attached thereto, extending alone the obverse side of the base.

15. The cap of claim 1 in which the primer layer is substantially cathodic disbondment resistant.

* * * * *

UNITED STATES PATENT AND TRADEMARK OFFICE
CERTIFICATE OF CORRECTION

PATENT NO. : 7,294,913 B2
APPLICATION NO. : 10/804316
DATED : November 13, 2007
INVENTOR(S) : Fred Fischer et al.

Page 1 of 1

It is certified that error appears in the above-identified patent and that said Letters Patent is hereby corrected as shown below:

Column 6, Line 26, In Claim 8, delete "can" and insert -- cap --

Column 6, Line 42 (Approx.), In Claim 14, delete "tot" and insert -- for --

Column 6, Line 45, In Claim 14, delete "igloo-shaper" and insert -- igloo-shaped --

Column 6, Line 47 (Approx.), In Claim 14, delete "fro" and insert -- for --

Column 6, Line 60, In Claim 14, delete "alone" and insert -- along --

Column 6, Line 59, In Claim 14, delete "line" and insert -- liner --

Signed and Sealed this

Twenty-sixth Day of January, 2010

David J. Kappos
*Director of the United States Patent and Trademark Office*